12) United States Patent
Aggarwal et al.

(10) Patent No.: US 9,173,067 B2
(45) Date of Patent: Oct. 27, 2015

(54) METHOD AND APPARATUS FOR PERFORMING A PASSIVE INDOOR LOCALIZATION OF A MOBILE ENDPOINT DEVICE

(71) Applicant: AT&T Intellectual Property I, L.P., Atlanta, GA (US)

(72) Inventors: Vaneet Aggarwal, Parsippany, NJ (US); Rittwik Jana, Montville, NJ (US); Sarat Puthenpura, Berkeley Heights, NJ (US); Nemmara K. Shankaranarayanan, Bridgewater, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 8 days.

(21) Appl. No.: 14/094,355

(22) Filed: Dec. 2, 2013

(65) Prior Publication Data

US 2015/0156611 A1 Jun. 4, 2015

(51) Int. Cl.
*H04W 24/00* (2009.01)
*H04W 4/04* (2009.01)
*G01S 19/06* (2010.01)
*H04W 64/00* (2009.01)

(52) U.S. Cl.
CPC ............. *H04W 4/04* (2013.01); *G01S 19/06* (2013.01); *H04W 64/006* (2013.01)

(58) Field of Classification Search
CPC . H04W 64/00; H04W 64/003; H04W 64/006; H04W 4/04; H04W 4/043; H04W 16/00; H04W 16/20; H04W 24/10; H04W 4/046; H04W 4/021
USPC .......... 455/404.2, 456.1, 456.2, 456.5, 456.6
See application file for complete search history.

(56) References Cited

U.S. PATENT DOCUMENTS

| 8,022,876 | B2 | 9/2011 | Huang et al. |
| 8,077,090 | B1 | 12/2011 | Chintalapudi et al. |
| 8,325,090 | B2 | 12/2012 | Luo et al. |
| 8,400,292 | B2 | 3/2013 | Kummetz |
| 8,433,337 | B2 | 4/2013 | Chin |
| 8,538,442 | B1 | 9/2013 | Ettinger et al. |
| 8,565,783 | B2 | 10/2013 | Yang et al. |

(Continued)

FOREIGN PATENT DOCUMENTS

| JP | 2013053930 A | 3/2013 |
| KR | 2013091082 A | 8/2013 |

OTHER PUBLICATIONS

Pu, Chuan-Chin, Chuan-Hsian Pu, and Hoon-Jae Lee. "Indoor location tracking using received signal strength indicator." the Emerging Communications for Wireless Sensor Networks, ISBN (2011): 978-953.

(Continued)

*Primary Examiner* — Jean Gelin

(57) ABSTRACT

A method, computer readable storage device and an apparatus for locating a mobile endpoint device in an indoor environment are disclosed. For example, the method generates a location map having a predicted signal strength for each respective location on the location map, receives a signal strength associated with the mobile endpoint device within the indoor environment, compares the signal strength to the location map having the predicted signal strength for each respective location on the location map and locates the mobile endpoint device as being at a particular location within the indoor environment.

19 Claims, 4 Drawing Sheets

(56) References Cited

U.S. PATENT DOCUMENTS

| | | | |
|---|---|---|---|
| 2004/0259554 A1* | 12/2004 | Rappaport et al. | 455/446 |
| 2007/0082667 A1* | 4/2007 | Redell et al. | 455/432.1 |
| 2010/0135178 A1* | 6/2010 | Aggarwal et al. | 370/252 |
| 2013/0109413 A1 | 5/2013 | Das et al. | |
| 2013/0172010 A1 | 7/2013 | Kang et al. | |
| 2013/0172020 A1 | 7/2013 | Aweya et al. | |
| 2013/0196684 A1 | 8/2013 | Dong et al. | |
| 2013/0237245 A1 | 9/2013 | Tinnakornsrisuphap et al. | |
| 2013/0281111 A1* | 10/2013 | Syrjarinne et al. | 455/456.1 |
| 2013/0294265 A1* | 11/2013 | Peng et al. | 370/252 |

OTHER PUBLICATIONS

Zàruba, Gergely V., et al. "Indoor location tracking using RSSI readings from a single Wi-Fi access point." Wireless networks 13.2 (2007): 221-235.

* cited by examiner

METHOD AND APPARATUS FOR PERFORMING A PASSIVE INDOOR LOCALIZATION OF A MOBILE ENDPOINT DEVICE

BACKGROUND

Identifying a location of a user indoors may have value for retailers and businesses. Traditional methods for locating a user indoors may not be sufficient (e.g., global positioning satellites (GPS), and the like).

Other methods for performing indoor localization require a person to take hundreds or thousands of active location-tagged measurements to pinpoint a user location. For example, a person must go to a specific location within an indoor location and take the measurements at that specific location and tag that location as having the taken measurements. This process is repeated over all of the various locations within the indoor location. This process can be very time consuming and inefficient.

In addition, when a database having the active location-tagged measurements is updated, the update is only for the single location. The update has no effect throughout the indoor location and is not propagated throughout the database.

SUMMARY

In one embodiment, the present disclosure provides a method, computer-readable storage device and apparatus for locating a mobile endpoint device in an indoor environment. In one embodiment, the method generates a location map having a predicted signal strength for each respective location on the location map, receives a signal strength associated with the mobile endpoint device within the indoor environment, compares the signal strength to the location map having the predicted signal strength for each respective location on the location map and locates the mobile endpoint device as being at a particular location within the indoor environment.

BRIEF DESCRIPTION OF THE DRAWINGS

The essence of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses a method, computer-readable storage device and apparatus for locating a mobile endpoint device in an indoor environment. The ability to accurately identify the location of a user within an indoor environment will have value for retailers and businesses. Traditional methods, such as for example, GPS do not work well indoors for identifying a location of a user within an indoor environment (e.g., in a particular room number or a particular aisle of a warehouse).

Other methods for performing indoor localization require a person to take hundreds or thousands of active location-tagged measurements to pinpoint a user location. For example, a person must go to a specific location within an indoor location and take the measurements at that specific location and tag that location as having the taken measurements. This process is repeated over all of the various locations within the indoor location. This process can be very time consuming and inefficient.

One embodiment of the present disclosure resolves these issues by providing a method for locating a mobile endpoint device in an indoor location (broadly an indoor environment) using passive indoor localization. In one embodiment, the present disclosure uses only radio transmissions (e.g., radio frequency (RF) signals) and a predictive model of signal strengths of one or more access points within a building to generate a building map having a predicted signal strength for a respective access point for each location within the building map. For example, the predicted signal strength may be an estimate of a signal strength level at various distances from the respective access point or the signal strength level at various locations within the indoor location based on obstructions such as walls, high furniture, shelving, and the like. Thus, no active-location tagged measurements are needed. In addition, the more the building map is used, the accuracy of the predictive signal strength for each location within the building map can be improved.

Figure 1:
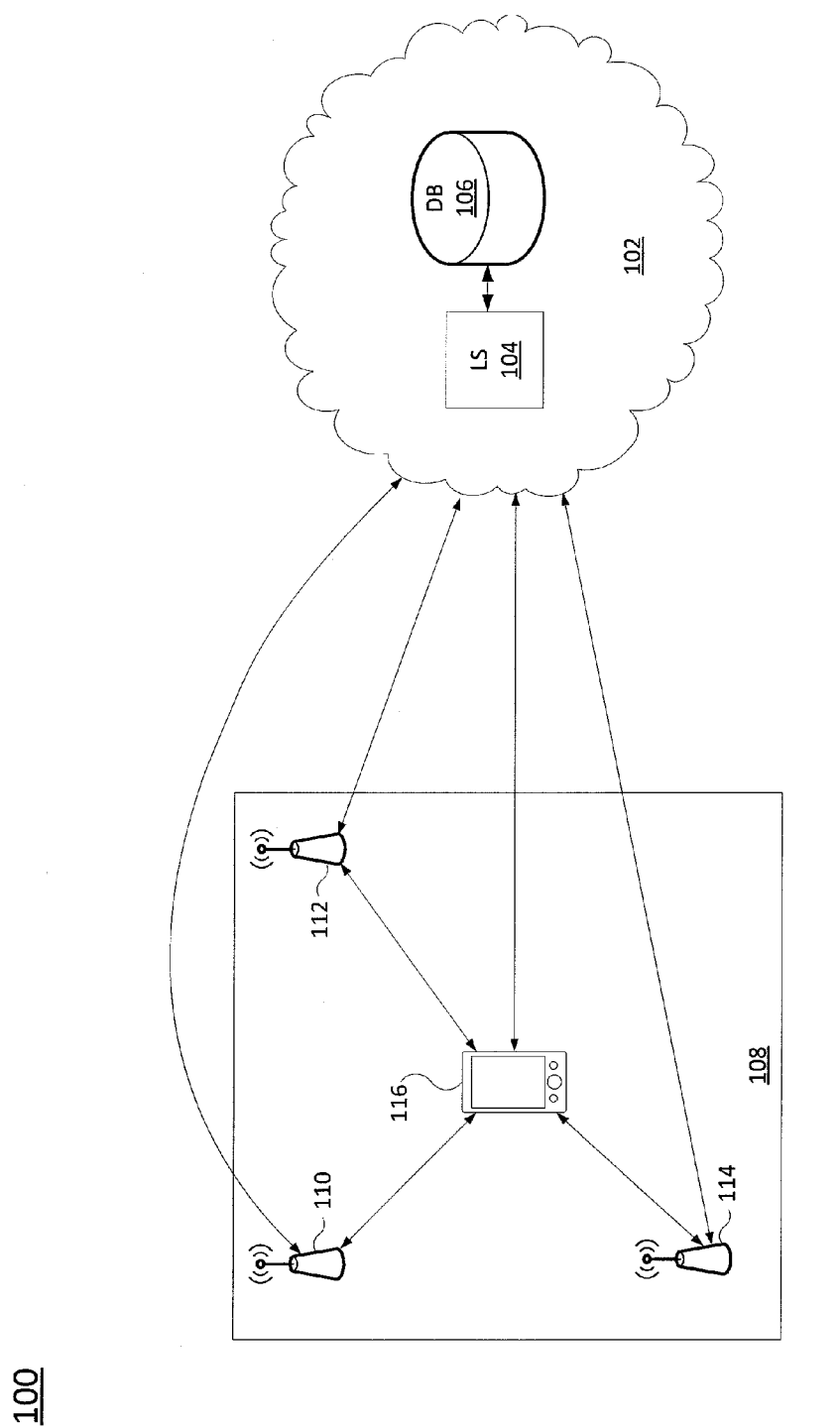
FIG. 1 illustrates one example of a communications network of the present disclosure.

FIG. 1 is a block diagram depicting one example of a communications network 100. For example, the communication network 100 may be any type of communications network, such as for example, a traditional circuit switched network (e.g., a public switched telephone network (PSTN)) or a packet network such as an Internet Protocol (IP) network (e.g., an IP Multimedia Subsystem (IMS) network), an asynchronous transfer mode (ATM) network, a wireless network, a cellular network (e.g., 2G, 3G, and the like), a long term evolution (LTE) network, and the like related to the current disclosure. It should be noted that an IP network is broadly defined as a network that uses Internet Protocol to exchange data packets.

In one embodiment, the communications network 100 may include a core network 102. The core network 102 may include a location server (LS) 104 (broadly an application server). The LS 104 may be deployed as a separate hardware device embodied as a general purpose computer (e.g., the general purpose computer 400 illustrated in FIG. 4) or an application server. Although the LS 104 is illustrated as being in the core network 102, the LS 104 may be located anywhere within the communication network (e.g., an access network (not shown)).

In one embodiment, the core network 102 may include additional network elements that are not disclosed. For example, the network 100 may include one or more access networks such as a cellular network, a wireless network, a wired network, a cable network, a Wireless Fidelity (Wi-Fi) network, and the like. In one embodiment, the core network 102 may also include additional network elements not shown to simplify the network illustrated in FIG. 1, such as for example, border elements, gateways, routers, switches, call control elements, various application servers, and the like.

The core network 102 may also include a database (DB) 106 in communication with the LS 104. The DB 106 may store generated building maps having a predicted signal strength for each location within the building map, locations of access points deployed in the building, identification information of each access point, details of a transmitter and/or antenna (e.g., a type, a power output, a gain, a signal pattern, and the like) of each access point, and the like. Although the DB 106 is illustrated as being located in the same location as the LS 104, the DB 106 may be located in another network (e.g., an access network (not shown)).

In one embodiment, one or more access points 110, 112 and 114 may be deployed at an indoor location or environment 108. In one embodiment, the indoor location 108 may have multiple floors and the access points 110, 112 and 114 may be deployed across different floors within the indoor location 108.

In one embodiment, the one or more access points 110, 112 and 114 may be in communication with a mobile endpoint device 116 and the LS 104 located in the core network 102 via one or more access networks. It should be noted that although three access points 110, 112 and 114 are illustrated, the network 102 may deploy any number of access points (e.g., more or less). It should also be noted that although only a single mobile endpoint device 116 is illustrated, any number of mobile endpoint devices may be deployed.

In one embodiment, the access points 110, 112 and 114 may be any type of access points, such as for example, a Wi-Fi hot spot, a femtocell, a Bluetooth® hot spot, a near field communication hot spot and the like. In one embodiment, the mobile endpoint device 116 may be any type of mobile endpoint device, such as for example, a laptop computer, a tablet computer, a smart phone, a cellular phone, a netbook computer, a personal digital assistant (PDA), and the like.

In one embodiment, the indoor location 108 may be an office building, a retail store, a warehouse, a mall, an area covered by tents and the like. The indoor location 108 may have interior walls, partitioned rooms or cubicles, various furniture, multiple floors, and the like, that could affect the signal strength of the access points 110, 112 and 114 and how the signal of the access points 110, 112 and 114 are propagated.

In one embodiment, based upon specific information about where the access points 110, 112 and 114 are deployed or located in the indoor location 108 and specific details about the transmitters or antennas of each of the access points 110, 112 and 114, the LS 104 may generate a predicted signal strength map over a detailed location map, e.g., a building map, of the indoor location 108.

For example, the LS 104 may apply a ray-trace model to predict a relative signal strength indicator (RSSI) for various locations within the indoor location 108. Any available ray-trace model may be used, for example, a dominant path model, an empirical propagation model (e.g., one slope model, Motley Keenan model, cost 231 multi-wall model, and the like), an indoor ray optical propagation model (e.g., a ray launching model, a ray tracing model, and the like), a CrossWave Propagation Model, and the like. The LS 104 may factor into the predictions various location features, e.g., building features. The building features may include, for example, a type of wall (e.g., a concrete wall versus a drywall or steel wall), a dimension of a wall (e.g., height, width, and thickness), a location of a wall, a piece of furniture (e.g., high shelving, a large piece of furniture, a small piece of furniture, a large desk or a mobile partition), and the like.

As a result, no active-location tagged measurements are needed. Based on the predictions of the LS 104 overlaid on the building map, the LS 104 may predict an indoor location of the mobile endpoint device 116. For example, the LS 104 may receive signal strength information associated with the mobile endpoint device 116 and then compare this actual received signal strength to the generated building map having the predicted signal strength for each location on the building to predict where the mobile endpoint device 116 is located. In other words, prediction may be an estimation of the location of the mobile endpoint device 116 within the building based upon the signal strength of one or more access points 110, 112 and 114 received by the mobile endpoint device 116.

In one embodiment, the signal strength information may be sent by the mobile endpoint device 116. In one embodiment, the mobile endpoint device 116 may identify which access points 110, 112 or 114 in the indoor location 108 are within range of the mobile endpoint device 116. In addition, the mobile endpoint device 116 may measure a signal strength (e.g., a RSSI) from a beacon of each one of the access points 110, 112 or 114 that is in range. The information may be collected by the mobile endpoint device 116 and sent to the LS 104.

In one embodiment, the more access points 110, 112 or 114 the mobile endpoint device 116 sends information about to the LS 104, the better the LS 104 will be able to determine a location of the mobile endpoint device 116. For example, having information about three or more access points may allow the LS 104 to triangulate and determine a more accurate location of the mobile endpoint device 116 as compared to having information about a single access point. The LS 104 may then compare the information to the building map having a predicted signal strength for each location on the building map to determine a location of the mobile endpoint device 116.

In another embodiment, the mobile endpoint device 116 may send a signal out to the access points 110, 112 and 114 that are configured to receive and measure such signal. For example, the access points 110, 112 and 114 may measure a signal strength of the signal sent by the mobile endpoint device 116. The access points 110, 112 and 114 may each send access point identification information to the LS 104 and the signal strength of the mobile endpoint device 116 detected by each respective access point 110, 112 and 114. The LS 104 may then compare the information to the building map having a predicted signal strength for each location on the building map to determine a location of the mobile endpoint device 116.

In one embodiment, the location update may be done on-demand to reduce overhead. For example, the LS 104 may control the location update in accordance with a request sent by the LS 104. In another embodiment, the LS 104 may control the location update in accordance with a pre-defined time period (e.g., once an hour, once a day, once a month, and the like). In yet another embodiment, the LS 104 may perform the location update continuously, e.g., whenever the access points 110, 112 and 114 have new updates to report.

In one embodiment, the more the building map is used, the more accurate the building map can become. For example, a location of the mobile endpoint device 116 may be needed to provide directions from the mobile endpoint device 116 to another location in the indoor location 108. The LS 104 may send the initial prediction of the location of the mobile endpoint device 116 using the signal strength information associated with the mobile endpoint device 116 that is received and the building map.

The LS 104 may then ask for confirmation of the location from the mobile endpoint device 116. In other words, the mobile endpoint device 116 may receive external information to verify the location of the mobile endpoint device 116, determine an error between the predicted location and the actual location and update the building map based upon the error.

In one embodiment, the mobile endpoint device 116 may deploy an application running on the endpoint device 116 to receive the exact location of the mobile endpoint device 116. For example, a user of the mobile endpoint device 116 may confirm the location determined by the LS 104 or provide an actual location (e.g., a coordinate, an aisle number, a department number, an office number, a floor number, a conference room name and the like). In another embodiment, sensors on the mobile endpoint device 116 may be used to provide location information, such as for example, a camera on the mobile endpoint device 116 taking images or video of the surroundings at the indoor location 108.

In one embodiment, the errors may be determined to be consistent at various locations within the indoor location 108. In turn, the building map can be updated by propagating the error to each location on the building map.

In one embodiment, the errors may be determined to be localized within a particular area. As a result, the errors may be determined to be due to a change to a building feature of the indoor location 108. For example, a new wall may have been installed or a wall may have been removed. As a result, the predicted signal strengths at the particular area may be updated to reflect the change to the building feature and the building map may be updated.

Figure 2:
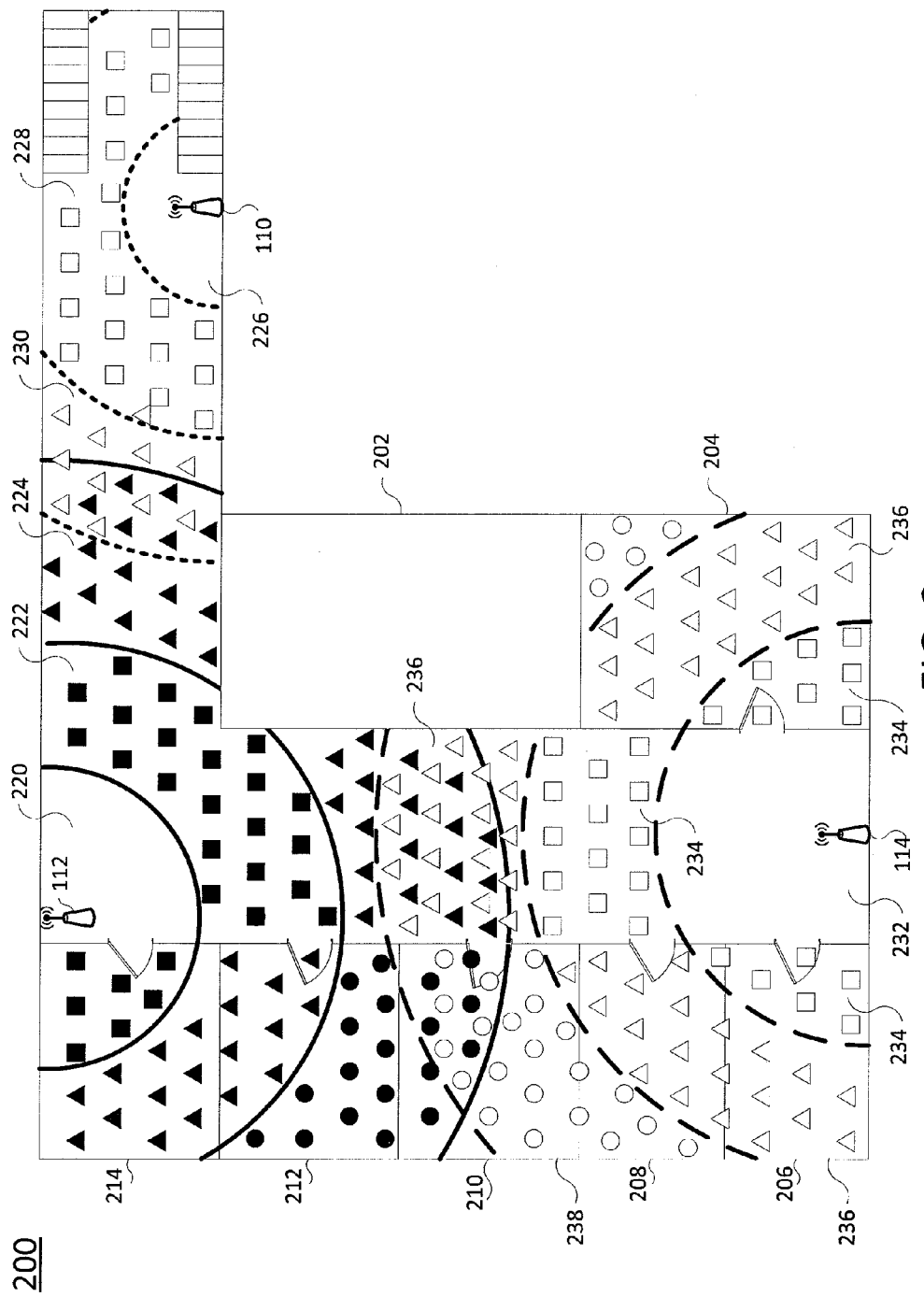
FIG. 2 illustrates one example of a building map having a predicted signal strength for each location within the building map.

FIG. 2 illustrates an illustrative building map 200 having a predicted signal strength for each location on the building map 200. In one embodiment, the building map 200 may be a building map of the indoor location 108 of FIG. 1. The building map 200 may be very detailed and include various building features such as the configuration of walls, a type of material of each wall, stair locations, locations of rooms 202, 204, 206, 208, 210, 212 and 214, locations of the access points 110, 112 and 114, and the like.

It should be noted that although FIG. 2 is illustrated in two dimensions, that the building map 200 may be illustrated in three dimensions. For example, the signals of the access points 110, 112 and 114 may emit a signal in a spherical pattern in three dimensions. Thus, the signals may be transmitted between floors as well as across a single floor. Thus, the building map 200 may illustrate in a building having multiple floors various predicted signal strengths for various points within the building.

The building map 200 may illustrate the predicted signal strengths of the access points 110, 112 and 114. For example, the access point 110 may have signal strength zones 226, 228 and 230. The access point 112 may have signal strength zones 220, 222 and 224. The access point 114 may have signal strength zones 232, 234, 236 and 238.

In one embodiment, the walls of the rooms 202, 204, 206, 208, 210, 212 and 214 may affect the signal strength of the access points 110, 112 and 114 at various locations. For example, the walls of rooms 204 and 206 may affect the signal strength of the access point 114. For example, without the walls, the rooms 204 and 206 should have the same signal strength of zone 232. However, due to the walls of the rooms 204 and 206, the rooms 204 and 206 are in a signal strength zone 234. Without any walls, the signal strength zone 232 may be farther from the access point 114 and the signal strength zone 234 may begin farther away from the access point 114.

Similarly, the walls of a conference room 202 may be made of concrete for privacy issues. As a result, none of the signals of the access points 110, 112 or 114 may reach inside the conference room 202 due to the concrete walls.

As illustrated by FIG. 2, some of the signal strength zones of the access points 110, 112 and 114 may overlap. For example, the signal strength zones 224 and 230 may overlap, the signal strength zones 212 and 236 may overlap, and so forth.

In one embodiment, using the building map 200, the LS 104 may determine a location of a mobile endpoint device 116 that is inside the indoor location 108. For example, the mobile endpoint device 116 may detect a signal strength associated with the signal strength of zone 238 from access point 114. The mobile endpoint device 116 may also detect a signal strength associated with the signal strength of zone 212. The mobile endpoint device 116 may send this signal strength information to the LS 104. The LS 104 may then compare the signal strength information to the building map 200 and determine that the mobile endpoint device 116 is located in room 210.

Notably, no active-location tagged measurements were taken to generate the building map 200. In fact, the building map 200 may be used immediately after being generated with the detailed building map, locations of the access points 110, 112 and 114 and details about a transmitter or antenna of each access point 110, 112 and 114. Thus, embodiments of the present disclosure provide a passive localization of the mobile endpoint deice 116 using only RF signals that is more efficient than the previously available methods.

Figure 3:
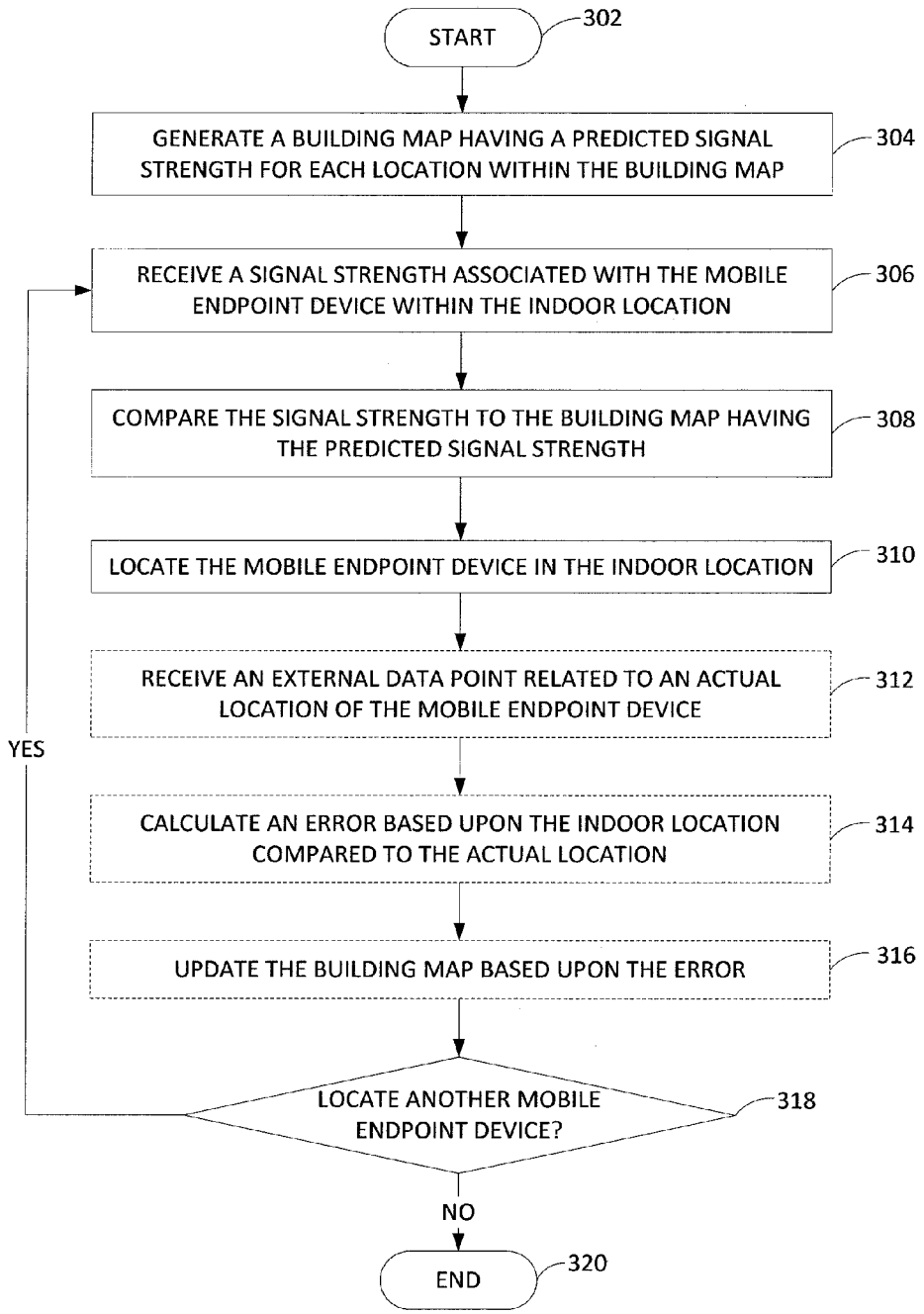
FIG. 3 illustrates an example flowchart of a method for locating a mobile endpoint device in an indoor environment.
Figure 4:
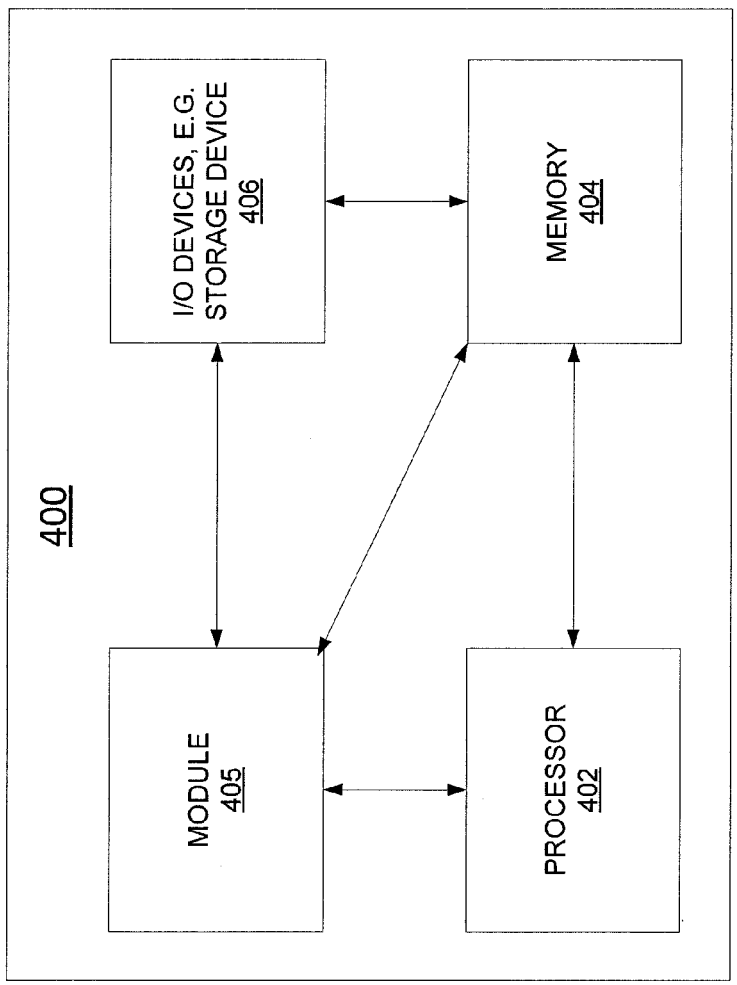
FIG. 4 illustrates a high-level block diagram of a general-purpose computer suitable for use in performing the functions described herein.

FIG. 3 illustrates a flowchart of a method 300 for locating a mobile endpoint device in an indoor location or environment. In one embodiment, the method 300 may be performed by an application server, e.g., the LS 104 or a general purpose computer as illustrated in FIG. 4 and discussed below.

The method 300 starts at step 302. At step 304 the method 300 generates a building map having a predicted signal strength for each location within the building map. It should be noted that the present disclosure does not require each and every single location within the building to be mapped. It is sufficient that a significant portion of the locations within the building is mapped. For example, a significant portion may comprise more than half of the locations in the building or a majority of the locations in the building. In one embodiment, based upon specific information about where the access points are deployed or located in the indoor location and specific details about the transmitters or antennas of each of the access points, the method 300 may generate a predicted signal strength map of one or more access points over a detailed building map of the indoor location.

For example, a ray-trace model may be applied to predict a relative signal strength indicator (RSSI) for various locations within the indoor location. Any available ray-trace model may be used, for example, a dominant path model, an empirical propagation model (e.g., one slope model, Motley Keenan model, cost 231 multi-wall model, and the like), an indoor ray optical propagation model (e.g., a ray launching model, a ray tracing model, and the like), a CrossWave Propagation Model, and the like. The various building features may be factored into the predictions. The building features may include, for example, a type of wall (e.g., a concrete wall versus a drywall or steel wall), a location of a wall, a piece of furniture (e.g., high shelving, a large piece of furniture, a small piece of furniture, a large desk, a mobile partition, and the like).

At step 306, the method 300 receives a signal strength associated with the mobile endpoint device within the indoor location. In one embodiment, the signal strength may be collected or calculated by the mobile endpoint device and sent to the LS. For example, a mobile endpoint device may identify which access points in the indoor location are within range of the mobile endpoint device. In addition, the mobile endpoint device may measure a signal strength (e.g., a RSSI) from a beacon of each one of the access points that is in range.

In another embodiment, the mobile endpoint device may send a signal out to the access points that are listening. The access points may measure a signal strength of the signal sent by the mobile endpoint device. The access points may each send access point identification information to the LS 104 and the signal strength of the mobile endpoint device detected by each respective access point along with the identification of the mobile endpoint device.

At step 308, the method 300 compares the signal strength to the building map having the predicted signal strength. For example, the method 300 may try to find a location on the building map that has a predicted signal strength that matches or is similar to the signal strength information that is received.

At step 310, the method 300 predicts or determines the mobile endpoint device as being at a particular indoor location. For example, based upon the comparison, the method 300 may determine a location of the mobile endpoint device to a specific area (e.g., an aisle number, a room, a zone, a floor number, and the like).

At optional step 312, the method 300 may receive an external data point related to an actual location of the mobile endpoint device. In one embodiment, the mobile endpoint device may deploy an application running on the endpoint device to receive the exact location of the mobile endpoint device. In another embodiment, sensors on the mobile endpoint device may be used to provide location information, such as for example, a camera on the mobile endpoint device taking images or video of the surroundings at a location of the indoor location.

At optional step 314, the method 300 may calculate an error based upon the indoor location compared to the actual location. For example, the mobile endpoint device uses the external information that is received to verify the location of the mobile endpoint device and determine an error between the predicted location and the actual location.

At optional step 316, the method 300 may update the building map based upon the error. In one embodiment, the errors may be determined to be consistent at various locations within the indoor location. The building map may then be updated by propagating the error to each location on the building map.

In one embodiment, the errors may be determined to be localized within a particular area. As a result, the errors may be determined to be due to a particular change to a building feature of the indoor location. For example, a new wall may have been installed or a wall may have been removed. As a result, the predicted signal strengths at the particular area may be updated to reflect the change to the building feature and the building map may be updated.

At step 318, the method 300 determines if the method 300 should locate another mobile endpoint device. For example, another request could be received to locate or provide location information of a mobile endpoint device. If another request to locate or provide location information of a mobile endpoint device is received, the method 300 may return to step 306 and repeat steps 306, 308 and 310, and optionally, steps 312, 314 and 316.

At step 318, if the method 300 determines that the method 300 does not need to locate another mobile endpoint device, the method 300 proceeds to step 320. At step 320, the method ends.

It should be noted that although not explicitly specified, one or more steps of the method 300 described above may include a storing, displaying and/or outputting step as required for a particular application. In other words, any data, records, fields, and/or intermediate results discussed in the methods can be stored, displayed, and/or outputted to another device as required for a particular application. Furthermore, steps, operations or blocks in FIG. 3 that recite a determining operation, or involve a decision, do not necessarily require that both branches of the determining operation be practiced. In other words, one of the branches of the determining operation can be deemed as an optional step.

FIG. 4 depicts a high-level block diagram of a general-purpose computer suitable for use in performing the functions described herein. As depicted in FIG. 4, the system 400 comprises a hardware processor element 402 (e.g., a central processing unit (CPU), a microprocessor, or a multi-core processor), a memory 404, e.g., random access memory (RAM) and/or read only memory (ROM), a module 405 for locating a mobile endpoint device in an indoor location, and various input/output devices 406 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the general-purpose computer may employ a plurality of processor elements. Furthermore, although only one general-purpose computer is shown in the figure, if the method(s) as discussed above is implemented in a distributed manner for a particular illustrative example, i.e., the steps of the above method(s) or the entire method(s) are implemented across multiple general-purpose computers, then the general-purpose computer of this figure is intended to represent each of those multiple general-purpose computers.

It should be noted that the present disclosure can be implemented in software and/or in a combination of software and hardware, e.g., using application specific integrated circuits (ASIC), a general purpose computer or any other hardware equivalents, e.g., computer readable instructions pertaining to the method(s) discussed above can be used to configure a hardware processor to perform the steps, functions and/or operations of the above disclosed methods. In one embodiment, instructions and data for the present module or process 405 for locating a mobile endpoint device in an indoor location (e.g., a software program comprising computer-executable instructions) can be loaded into memory 404 and executed by hardware processor element 402 to implement the steps, functions or operations as discussed above in connection with the exemplary method 300. The processor executing the computer readable or software instructions relating to the above described method(s) can be perceived as a programmed processor or a specialized processor. As such, the present module 405 for locating a mobile endpoint device in an indoor location (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for locating a mobile endpoint device in an indoor environment, comprising:
generating, by a processor, a location map of the indoor environment having a predicted signal strength for a respective location on the location map, wherein the generating the location map comprises applying a ray-tracing based model, wherein the ray-tracing based model is based upon location features of the indoor environment, wherein the location features comprise a location and a type of a wall in the indoor environment;
receiving, by the processor, a signal strength associated with the mobile endpoint device within the indoor environment;
comparing, by the processor, the signal strength associated with the mobile endpoint device to the location map having the predicted signal strength for the respective location on the location map; and
locating, by the processor, the mobile endpoint device as being at a particular location within the indoor environment based on the comparing.

2. The method of claim 1, wherein the generating the location map having the predicted signal strength further comprises:
obtaining, by the processor, a plurality of locations of a plurality of access points deployed in the indoor environment; and
obtaining, by the processor, details of a plurality of transmitters of the plurality of access points, wherein the applying the ray-tracing based model comprises applying the ray-tracing based model to the plurality of access points based upon the location features of the indoor environment.

3. The method of claim 2, wherein the location features further comprise a location and a type of a furniture in the indoor environment.

4. The method of claim 1, wherein the signal strength associated with the mobile endpoint device comprises a relative signal strength indicator measurement.

5. The method of claim 1, wherein the signal strength associated with the mobile endpoint device is received from the mobile endpoint device and comprises a measured signal strength received from at least one access point.

6. The method of claim 5, wherein the measured signal strength is received from each one of the at least one access point that comprises a plurality of access points.

7. The method of claim 1, wherein the signal strength associated with the mobile endpoint device is received from at least one access point and comprises a measured signal strength of a signal received from the mobile endpoint device.

8. The method of claim 7, wherein the signal strength associated with the mobile endpoint device is received from the at least one access point that comprises a plurality of access points.

9. The method of claim 1, further comprising:
updating, by the processor, the location map.

10. The method of claim 9, wherein the updating comprises:
receiving, by the processor, an external data point related to an actual location of the mobile endpoint device; and
calculating, by the processor, an error based upon the particular location of the mobile endpoint device as compared to the actual location of the mobile endpoint device.

11. The method of claim 10, further comprising:
updating, by the processor, the location map by propagating the error to the respective location on the location map.

12. The method of claim 10, further comprising:
identifying, by the processor, a location feature of the indoor environment that has changed based upon a plurality of errors within a second location of the location map; and
updating, by the processor, the location map and the predicted signal strength for the respective location within the location map based upon the location feature of the indoor environment that has changed.

13. A non-transitory computer-readable storage device storing a plurality of instructions which, when executed by a processor, cause the processor to perform operations for locating a mobile endpoint device in an indoor environment, the operations comprising:
generating a location map having a predicted signal strength for a respective location on the location map, wherein the generating the location map comprises applying a ray-tracing based model, wherein the ray-tracing based model is based upon location features of the indoor environment, wherein the location features comprise a location and a type a wall in the indoor environment;
receiving a signal strength associated with the mobile endpoint device within the indoor environment;
comparing the signal strength associated with the mobile endpoint device to the location map having the predicted signal strength for the respective location on the location map; and
locating the mobile endpoint device as being at a particular location within the indoor environment based on the comparing.

14. The non-transitory computer-readable storage device of claim 13, wherein the generating the location map having the predicted signal strength comprises:
obtaining a plurality of locations of a plurality of access points deployed in the indoor environment; and
obtaining details of a plurality of transmitters of the plurality of access points, wherein the applying the ray-tracing based model comprises applying the ray-tracing based model to the plurality of access points based upon the location features of the indoor environment.

15. The non-transitory computer-readable storage device of claim 13, wherein the signal strength associated with the mobile endpoint device is received from the mobile endpoint device and comprises a measured signal strength received from at least one access point.

16. The non-transitory computer-readable storage device of claim 13, wherein the signal strength associated with the mobile endpoint device is received from at least one access point and comprises a measured signal strength of a signal received from the mobile endpoint device.

17. The non-transitory computer-readable storage device of claim 13, further comprising:
updating the location map.

18. The non-transitory computer-readable storage device of claim 17, wherein the updating comprises:
receiving an external data point related to an actual location of the mobile endpoint device; and
calculating an error based upon the particular location of the mobile endpoint device as compared to the actual location of the mobile endpoint device.

19. An apparatus for locating a mobile endpoint device in an indoor environment, comprising:
- a processor; and
- a computer-readable storage device storing a plurality of instructions which, when executed by the processor, cause the processor to perform operations, the operations comprising:
  - generating a location map having a predicted signal strength for a respective location on the location map, wherein the generating the location map comprises applying a ray-tracing based model, wherein the ray-tracing based model is based upon location features of the indoor environment, wherein the location features comprise a location and a type a wall in the indoor environment;
  - receiving a signal strength associated with the mobile endpoint device within the indoor environment;
  - comparing the signal strength associated with the mobile endpoint device to the location map having the predicted signal strength for the respective location on the location map; and
  - locating the mobile endpoint device as being at a particular location within the indoor environment based on the comparing.

* * * * *